(12) United States Patent
Cheong et al.

(10) Patent No.: US 7,758,941 B2
(45) Date of Patent: Jul. 20, 2010

(54) OPTICAL DATA STORAGE MEDIUM WITH SUPER RESOLUTION LAYER

(75) Inventors: Byung-Ki Cheong, Seoul (KR); Hyun-Suk Lee, Seoul (KR); Taek-Sung Lee, Seoul (KR); Won-Mok Kim, Seoul (KR); Kyeong-Seok Lee, Seoul (KR); Jae-Won Lee, Seoul (KR); Sung-Ho Cho, Choongchungnam-Do (KR)

(73) Assignee: Korea Institute of Science and Technology, Seoul (KR)

( * ) Notice: Subject to any disclaimer, the term of this patent is extended or adjusted under 35 U.S.C. 154(b) by 771 days.

(21) Appl. No.: 10/977,604

(22) Filed: Oct. 28, 2004

(65) Prior Publication Data
US 2005/0208257 A1 Sep. 22, 2005

(30) Foreign Application Priority Data
Mar. 22, 2004 (KR) ...................... 10-2004-0019455

(51) Int. Cl.
*B32B 3/02* (2006.01)
(52) U.S. Cl. .................. 428/64.1; 428/64.4; 430/270.11
(58) Field of Classification Search ................ 428/64.1, 428/64.4, 64.5; 430/270.11, 270.13
See application file for complete search history.

(56) References Cited

U.S. PATENT DOCUMENTS

| | | | | |
|---|---|---|---|---|
| 5,270,995 | A * | 12/1993 | Wada et al. | 369/101 |
| 6,268,034 | B1 * | 7/2001 | Kitaura et al. | 428/64.1 |
| 6,480,123 | B2 * | 11/2002 | Tsutsui et al. | 341/50 |
| 6,670,014 | B2 * | 12/2003 | Nishihara et al. | 428/64.1 |
| 6,733,858 | B2 * | 5/2004 | Mizushima et al. | 428/64.1 |
| 6,965,556 | B1 * | 11/2005 | Kikukawa et al. | 369/284 |
| 2006/0072435 | A1 * | 4/2006 | Hayashibe et al. | 369/275.1 |
| 2006/0141202 | A1 * | 6/2006 | Suenaga | 428/64.1 |

OTHER PUBLICATIONS

B. Cheong, et al., "A Material Development Toward Long Cyclic Super-resolution Readout and Writing", Technical digest of International Symposium on Optical Memory 2003, Nov. 3, 2003).

* cited by examiner

*Primary Examiner*—Elizabeth Mulvaney
(74) *Attorney, Agent, or Firm*—Sughrue Mion, PLLC (57) ABSTRACT

An optical data storage medium comprises a super-resolution (SR) layer consisting of thermoelectric material, said SR layer having light absorption, transmittance and reflectance at the wavelength of an incident light and maintaining a crystalline single phase without a structural or chemical change below the melting temperature of the material. SR readout of data from and/or SR writing of data onto the medium is carried out by way of thermoelectrically induced optical changes within a local area of the SR layer under laser irradiation.

3 Claims, 8 Drawing Sheets

ROM pit size~0.20 μm

FIG. 7B

ROM pit size~0.25 μm

FIG. 8

OPTICAL DATA STORAGE MEDIUM WITH SUPER RESOLUTION LAYER

BACKGROUND OF THE INVENTION

1. Field of the Invention

The present invention relates to an optical data storage medium in an optical data storage device, more particularly, a high density optical data storage medium where the spot size of a laser light focused on the medium secondarily is decreased below the diffraction limit through interaction with a super resolution (SR) material constituting the medium.

2. Description of the Background Art

A primary method to boost the recording density of an optical recording medium is to reduce the spot size of a laser beam in use for recording and reproducing information. When a laser beam of a wavelength $\lambda$ with a Gaussian intensity profile is focused through an objective lens with a numerical aperture NA, it has a full width half maximum (FWHM) spot size of $0.59 \lambda/NA$ at diffraction limit, setting a limit in readout resolution to $\lambda/2NA$ in terms of a spatial period. Accordingly, in order to achieve a high density for an optical recording medium by use of a diffraction-limited focused light, it is necessary to reduce the wavelength $\lambda$ or to increase the numerical aperture of the objective lens. However, the increase in storage density by the conventional art has reached a practical limit, as use has been already made of laser light with a shortest wavelength in the visible regime along with a high NA (0.85) close to the theoretical maximum of numerical aperture (1.0).

Numerous techniques have been proposed to overcome light diffraction limit and thereby to accomplish a high density recording and readout. Among them, SR techniques make it possible to reproduce a high density information of a spatial period above $\lambda/2NA$ by use of a reduced beam spot relative to the one at diffraction limit, which derives from optical changes of various physical origins within a portion of the irradiated area of an SR layer constituting the optical recording medium. These techniques have a remarkable advantage over other techniques in that a high density can be achieved beyond that of diffraction limit, yet on the basis of a far-field optic system of the existing optical recording devices.

Led by a U.S. Pat. No. 5,153,873 which discloses a SR optical recording medium including a single layer nonlinear material, SR techniques have been proposed utilizing various groups of materials such as thermochromic materials, photochromic materials, phase change materials, optical bistable materials, and higher-order nonlinear optical materials.

SR materials utilized in the existing SR techniques may be divided into two different types on the basis of the way that optical transmittance (ratio of transmitted light intensity to incident light intensity) varies with incident light intensity. Examples of the two types are shown in FIGS. 1A to 1B and FIGS. 2A to 2B, where optical transmittance is increased with incident light intensity.

Figure 1A:
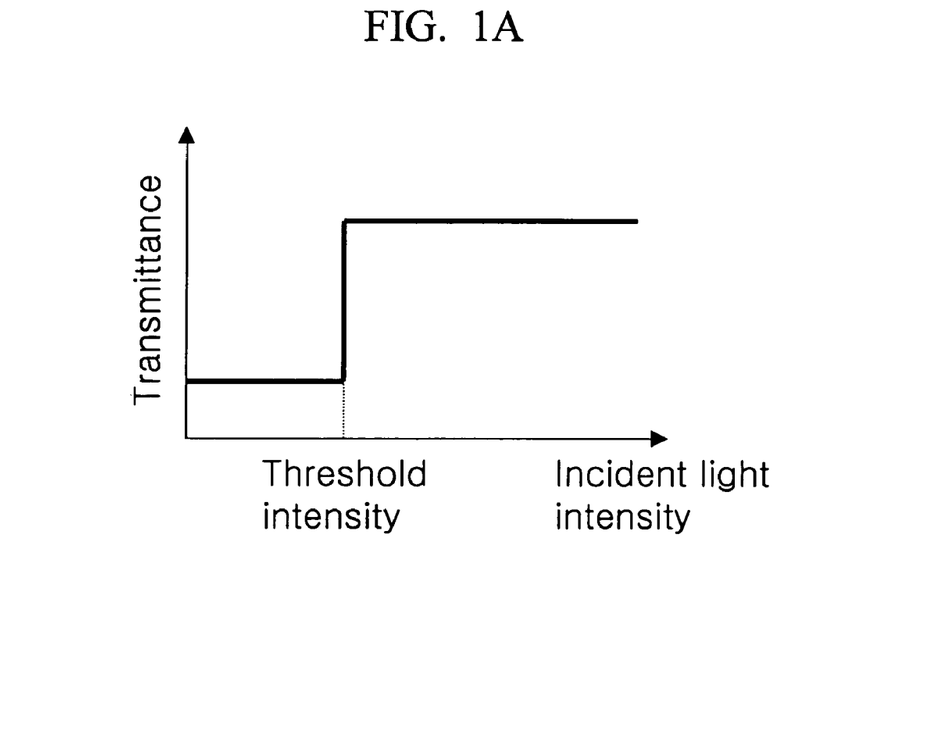
FIG. 1A is a graph showing schematically optical transmittance varying with incident light intensity for the super-resolution layer of a first kind.
Figure 1B:
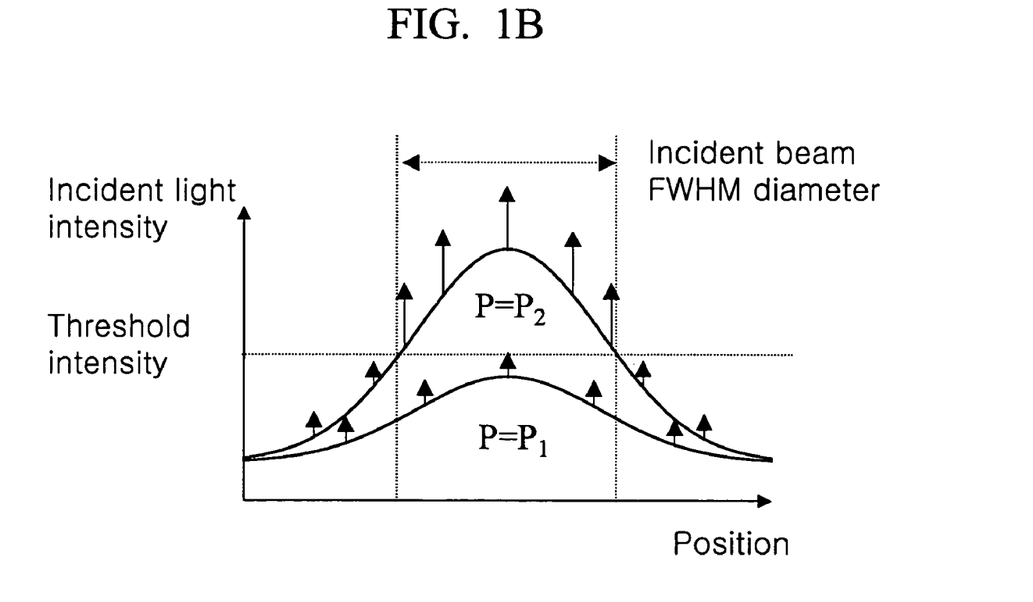
FIG. 1B is a graph showing schematically distributions of optical transmittance along the intensity profiles of incident light at two different powers ($P_2>P_1$) for the super-resolution layer of a first kind.

In the case of an SR material as typified in FIG. 1A, optical transmittance changes discontinuously once light intensity or temperature rise due to light absorption exceeds a threshold intensity or a threshold temperature with increasing incident light power. FIG. 1B schematically illustrates how incident light may change in its intensity profile, upon transmission through the SR layer, with increasing incident light power ($P_2 > P_1$). At a lower power ($P_1$), optical transmittance is uniform and low (denoted by shorter arrows) along the Gaussian intensity profile of the incident light but, at a higher power ($P_2$), the intensity profile bears a portion around the center where light intensity exceeds a threshold value to yield a higher optical transmittance (denoted by longer arrows) than that of the peripheral portion (the central region of the super-resolution layer with a different optical transmittance from the rest is denoted hereafter as an aperture). The size of the aperture increases with increasing incident light power.

An SR material of this type is structurally and chemically discontinuous at a threshold intensity (temperature), undergoing a transition between phases of different refractive indices and extinction coefficients. Examples include thermochromic, photochromic materials of either organic or inorganic nature, phase change materials and so on. As for the phase change materials in particular, examples include materials undergoing solid-solid phase transitions such as AgZn and CuAlNi; compound materials undergoing decompositions such as AgO; materials undergoing solid-liquid phase transitions such as chalcogenide alloys like Ge—Sb—Te, In—Sb—Te and pure metals like In, Te, Bi, Pb, Sn, Sb; and materials consisting of dielectric matrices with dispersions of the aforementioned materials having solid-liquid phase transitions.

Figure 2A:
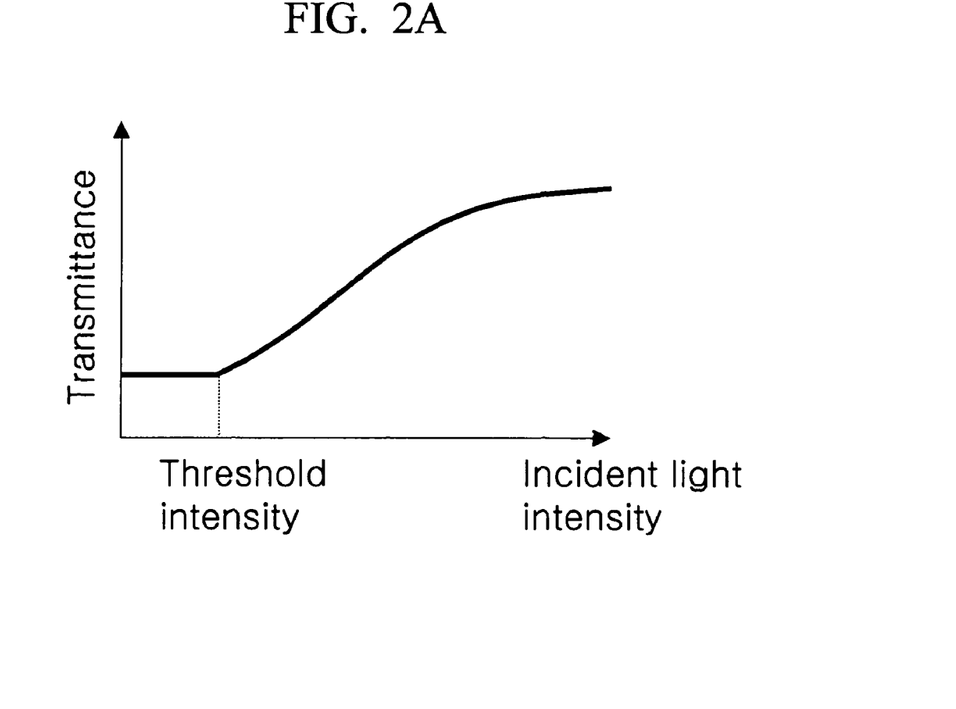
FIG. 2A is a graph showing schematically optical transmittance varying with incident light intensity for the super-resolution layer of a second kind.
Figure 2B:
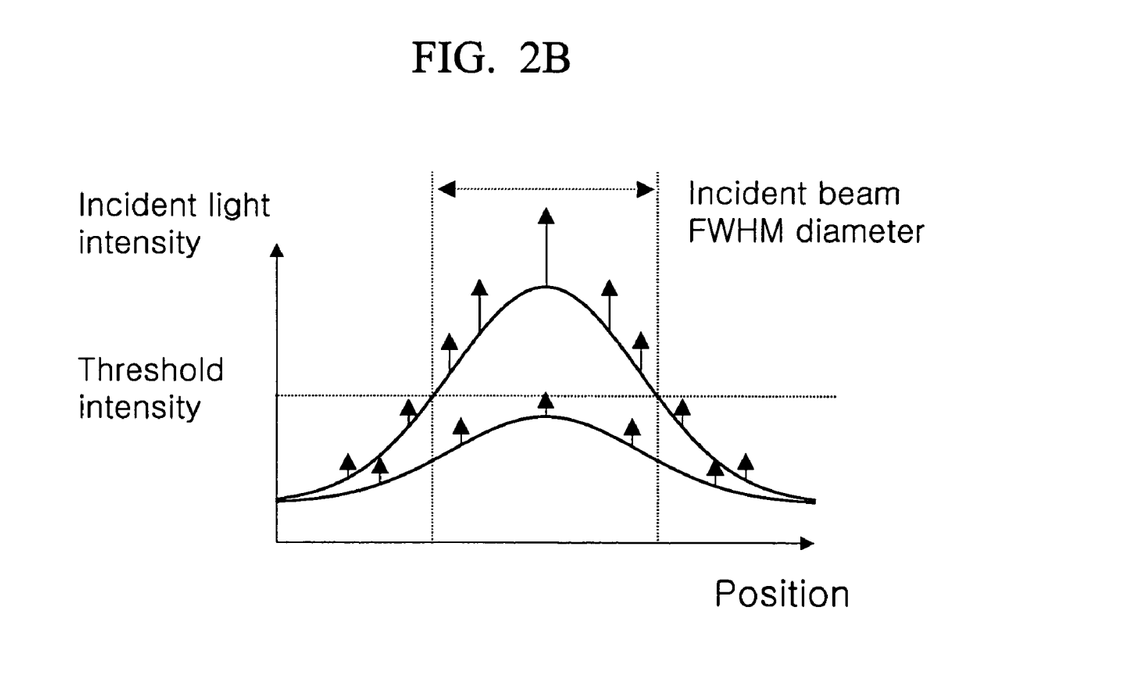
FIG. 2B is a graph showing schematically distributions of optical transmittance along the intensity profile of incident light at two different powers ($P_2>P_1$) for the super-resolution layer of a second kind.

In the case of an SR material of the other type, optical transmittance tends to increase not discontinuously but gradually once light intensity exceeds a threshold value with increasing incident light power, as shown in FIG. 2A. In relation to this, FIG. 2B schematically shows how incident light may change in its intensity profile, upon transmission through the super-resolution layer, with increasing power. In FIG. 2B, the arrows indicate the relative magnitudes of optical transmittance according to the local intensity of incident light along each intensity profile. Compared with FIG. 1B, it is noticed that, at a higher power, the intensity profile bears a portion around the center where light intensity exceeds a threshold value, yielding a gradual increase of optical transmittance with light intensity.

An SR material of this type has neither structural nor chemical change beyond threshold intensity but undergoes a gradual change in optical characteristics as light intensity increases beyond the threshold value. As a typical example, there exists a group of materials, called self-focusing materials, that have intensity-dependent capability of focusing light due to third order nonlinear optical effect. Besides, there are saturable-absorption materials showing a gradual change in optical transmittance over a wide range of light intensity beyond threshold value.

Regardless of its type, an SR material is supposed to satisfy the following requirements primarily. First, changes in optical properties must be sufficiently large across the threshold intensity (temperature). Second, said changes should occur rapidly and reversibly with changing laser intensity. Third, a laser power should not be too high to reach the threshold intensity (temperature). Fourth, an SR material should have a high endurance against repetitive laser irradiation for use in read-only-memory (ROM) disks, write-once-read-many (WORM) disks and rewritable disks as well.

SR technique has been considered to have a high potential for ultrahigh density optical data storage beyond optical diffraction limit without sacrificing a critical advantage of the present optical disk technology, i.e. removability. Except for magneto-optic disks, however, SR technique has rarely been materialized due to unsuccessful development of a material satisfying all the aforementioned requirements.

As for the first two requirements which are especially critical to SR capability of reproducing information below a resolution limit, the most promising results have been obtained mostly with materials yielding large changes in optical properties due to phase transitions of either melting or decomposition, hence SR materials of the first type. Each of these materials, however, has led to limited readout cycles as in the case of 'premastered optical disk by super resolution (PSR)' utilizing the melting transition of a chalcogenide GeSbTe alloy or limited applicability to write once read many type disks as in the case of super resolution near-field structure (Super-RENS) disks utilizing the oxide decomposition of either AgO or PtO. For an SR technique to find its use in ROM disks and rewritable disks in particular, development of a new class of SR materials appears to be called for that can maintain a high SR capability during a long cyclic readout and/or writing operation. To fulfill such a requirement, materials are not supposed to owe their SR capability to phase changes, especially of the kinds accompanying structural changes.

Accordingly, there is an urgent need for the development of a practical SR material that can provide a high endurance against repetitive laser irradiation as well as with a high carrier to noise (C/N) ratio and is thus applicable to ROM disks, WORM disks and rewritable disks.

SUMMARY OF THE INVENTION

It is an objective of the present invention to provide an SR material that is applicable to ROM, WORM and rewritable disks, yielding not only a high carrier-to-noise ratio but a high endurance against repetitive reading and writing and also to provide an optical data storage medium using the same.

An optical data storage medium according to the present invention comprises an SR layer consisting of a thermoelectric material, said SR layer having light absorption, transmittance and reflectance at the wavelength of an incident light and maintaining a crystalline single phase without a structural or a chemical change below the melting temperature of the material, wherein SR readout of data from and/or SR writing of data onto the medium is carried out by way of thermoelectrically induced optical changes within a local area of the SR layer under laser irradiation as follows.

When a focused laser beam with a Gaussian intensity profile irradiates a thermoelectric thin film, a strong optical absorption may take place, providing that the photon energy of the incident beam exceeds the band gap of the material. This, in turn, leads to a spatial temperature profile with a steep gradient, benefiting by a low thermal conductivity that is required for a good thermoelectric material in general. Along the temperature profile, carrier population could vary by diffusion to set up a Seebeck voltage. Supposedly, a material with a larger thermoelectric Seebeck coefficient tends to have a carrier population varying more rapidly along the profile, resulting in a steeper variation of optical constants as well. Under these circumstances, light with a planar wave front, upon exit from the thermoelectric thin film, may be altered to have a curved wave front with a modified intensity profile, possibly enabling SR readout and/or SR writing of tiny data marks.

Based on the above principle, the SR material in accordance with the present invention has the following selection rules.

First, light absorption as well as light transmittance should occur at the wavelength of laser used. A semiconductor with a band gap less than the photon energy at the selected wavelength, a semi-metal or a metal is preferable so that light absorption can occur at a selected laser wavelength from near-infrared light to blue-violet light (from 780 to 400 nm in wavelength or from 1.6 to 3.1 eV in photon energy), presently used for a commercial optical data storage device. Semiconductors or semi-metals are more preferable since light transmittance is easier to control with these materials. In case that one of these materials is used in an optical disk as an SR layer, the layer thickness is selected, preferably from 1 nm to 100 nm, depending on light extinction coefficient so that light transmittance can occur along with light absorption.

Second, an SR material should have a low thermal conductivity so that a temperature profile with a steep gradient can be obtained in a narrow region at a relatively low laser power. The laser light intensity in conventional optical data storage devices free of an SR technique is about 1 mW/$\mu$m$^2$ for reading data, and about 10 mW/$\mu$m$^2$ for writing data on a phase-change type rewritable disk. Due to its light absorption characteristic, the SR layer in accordance with the present invention causes additional consumption of laser power for readout and writing, when applied to a recordable disk for instance. For SR readout and writing at light intensities much less than three to five times (commercially acceptable maximum) the respective conventional values, thermal conductivity of an SR material is desirably as low as possible. A proper choice may be made of a semiconductor or a semi-metal with a large carrier scattering and a small mobility.

Third, an SR material should have a strong thermoelectric property so as to yield a large electric potential gradient for a given temperature gradient and its Seebeck coefficient should be high. The main feature of the present invention is to utilize an optical change that is thermoelectrically induced within a local area of the SR layer under laser irradiation by way of building up a gradient in carrier population in the presence of a temperature gradient. Accordingly, an SR material should have a large Seebeck coefficient to set up a carrier distribution with a large gradient i.e. a large electric field, for a given temperature gradient. A rough estimate of a required Seebeck coefficient may be made as follows. When 650 nm laser light having a power of 1 mW is focused through 0.6 NA objective lens, the focused light has the power density (or intensity) of about 1 mW/$\mu$m$^2$. Recall that light intensity in vacuum is expressed by the following formula:

$$I = \frac{n|E_o|^2}{2Z_o}$$

(wherein, I is light intensity, and n and $Z_0$ are refractivity and impedance in vacuum.).

From the formula, the electric field $E_0$ of the said focused light in vacuum reads about 10$^6$ V/m, and it would be smaller inside an SR layer because of light absorption. To assess the magnitude of the thermoelectrically induced field within an SR layer, let us assume that the temperature difference over the radius of the focused beam (distance from the center to the 1/e$^2$ point in the intensity profile; 0.5 $\mu$m for 650 nm and 0.6 NA) in an SR layer is about 500K and the thermoelectric coefficient of the SR material is about 10$^2$ to 10$^3$ $\mu$V/K. The resulting electric field is found about 10$^5$ to 10$^6$ V/m i.e., about 10 to 100% of the electric field of the focused light in vacuum. Accordingly, a Seebeck coefficient of about 10$^2$ to 10$^3$ $\mu$V/K may give rise to a substantial thermoelectric field within an SR layer.

Fourth, an SR material should undergo neither structural nor chemical change during heating in a solid state below its melting temperature. One of the major requirements for an SR material is that changes in optical properties resulting from increase of light intensity (or temperature) should vanish rapidly as light intensity (or temperature) decreases back across the threshold value. Thus, if an SR material forms via sputter deposition, an art widely used by optical disk manufacturers for thin film deposition, an amorphous phase state that is not stable with respect to a phase change to a crystalline state by repetitive laser heating during readout or writing, the material is not appropriate as an SR layer in accordance with the present invention. Accordingly, an SR material according to the present invention forms via sputter deposition either crystalline state of a strong thermoelectric property or an amorphous state having a strong thermoelectric property and a high phase stability against heating as well.

A thermoelectric SR material in accordance with the present invention is stable over a wide temperature range from room temperature to its melting temperature with neither phase change nor phase decomposition, has a large thermoelectric coefficient of more than 100 µV/K, and preferably forms a crystalline phase by sputter deposition. Preferably selected materials for an SR layer are chalcogenide stoichiometric compounds belonging to IV-VI, V-VI or IV-V-VI families or solid solution mixtures of these compounds, wherein IV group elements are Ge, Sn and Pb, V group elements are As, Sb and Bi, and VI group elements are S, Se and Te. Examples of the materials include stoichiometric binary compounds such as SnTe, PbTe, $Sb_2Te_3$, $Bi_2Te_3$, etc., solid solution mixtures of these binary compounds such as (Sn,Pb)Te, $(Sb,Bi)_2Te_3$, etc., or stoichiometric ternary compounds such as Sn—Bi—Te, Pb—Bi—Te, Pb—Sb—Te and Sn—Sb—Te with IV-V-VI composition ratio of about 4-1-5 or 2-2-5 or 1-2-4 or 1-4-7 and solid solution mixtures of these ternary compounds.

Besides, examples of large thermoelectric materials includes binary alloy solid solutions of Si and Ge, $Si_xGe1-_x$ (x is 0.7 to 0.8), or binary silicide compounds of transition metals having 3d valence electrons such as Fe, Cr Co, Mn, etc., or Zn—Sb binary compounds, or rare earth oxides such as $Eu_2O_3$, $Y_2O_3$, $Gd_2O_3$, $Ho_2O_3$, etc., superconductive oxides of La—Cu—O type. If these materials are stable against laser heating during readout and writing, they can be utilized as the SR material according to the present invention.

The SR materials in accordance with the present invention can be applied to ROM disks utilizing thermoelectrically induced optical changes in solid state for readout, and also applied to WORM or rewritable disks utilizing thermoelectrically induced optical changes in solid state for readout and writing. Moreover, the SR materials may be used for WORM or rewritable disks which utilize thermoelectrically induced optical changes in solid state for readout and utilize phase changes from solid to liquid for writing.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Hereinafter, the present invention will be described in more detail with reference to the following example using PbTe. However, the following example is just for illustration of the invention and the present invention is not limited thereto. PbTe is known as a compound semiconductor with large thermoelectric coefficient of about 300 µV/K at room temperature and high stability over a wide temperature range from room temperature to its melting point of 917° C. as a crystalline single phase.

EXAMPLE 1

PbTe thin films were prepared by co-sputtering of Pb and Te targets in a radio frequency (RF) magnetron sputter unit. RF sputter power to each target was controlled so as to yield about the same deposition rate for each element and the resulting films were found to have the composition of Pb-51 at. % Te-49 at. % from Rutherford backscattering spectroscopy (RBS) analysis. As to samples for structural and optical characterization, each was made to have a 3-layer stack consisting of a single layer of PbTe film sandwiched with ZnS—$SiO_2$ protective layers on a glass substrate.

Figure 3:
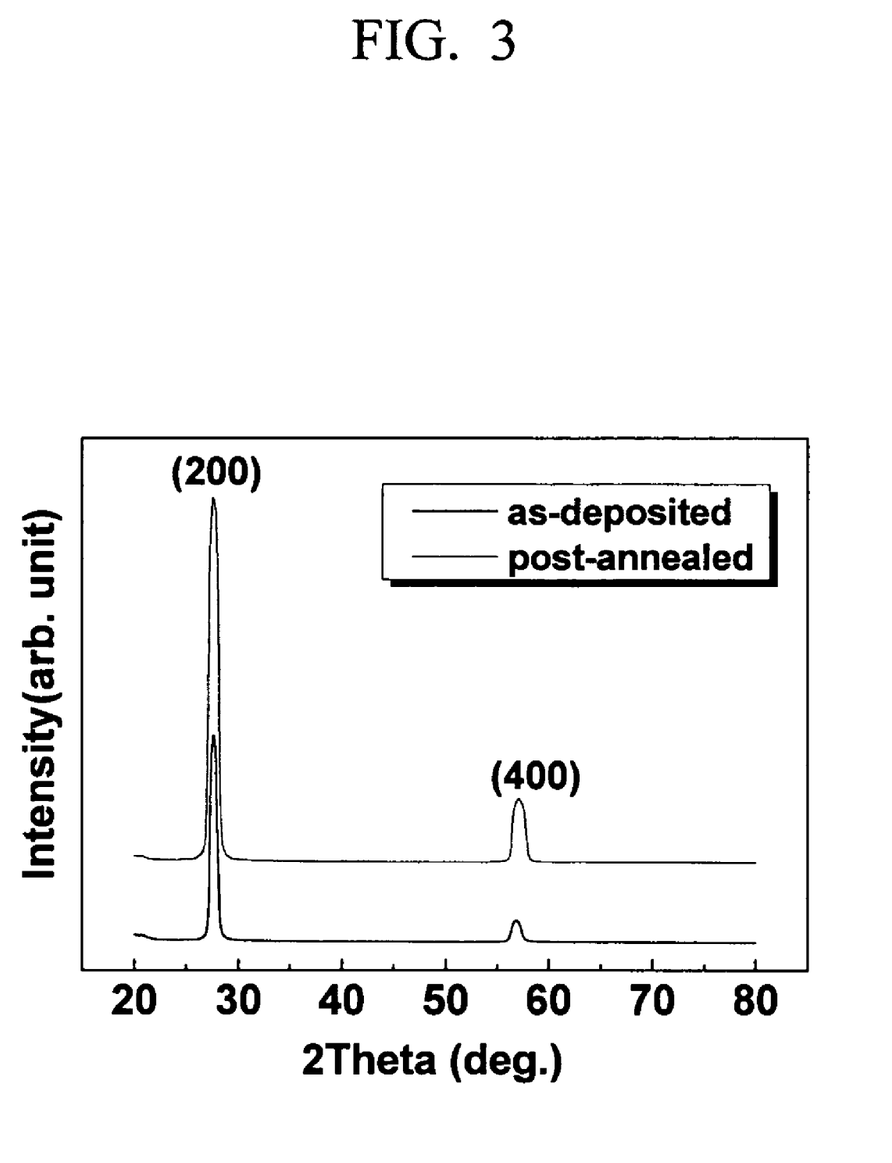
FIG. 3 is a graph showing XRD spectra of PbTe thin films in as-deposited and annealed (at 250° C. for 5 min. in an Ar atmosphere) states, respectively.

Structural analyses were carried out by use of X-ray diffractometer (XRD) with samples having ZnS—$SiO_2$ protective layers of 10 nm thick. Shown in FIG. 3 ia the X-ray diffraction spectra from as-deposited and post-annealed at 250° C. for 5 min in an Ar atmosphere. Clearly, PbTe films in both states are essentially of the same crystalline single phase. The PbTe film is able to form a stable crystalline single phase even in the vapor-quenched state (about $10^{12}$-$10^{14\circ}$ K/sec), ruling out the possibility of forming an amorphous phase under laser cooling conditions (about $10^9$-$10^{11\circ}$ K/sec). Such a high phase stability with little dependence on thermal history is an important attribute required for an SR material.

EXAMPLE 2

Thermo-optic characterization of the PbTe thin film material was conducted with 3-layer samples having 15 nm thick PbTe films sandwiched with λ/2n thick (λ and n are wavelength and refractive index, respectively) ZnS—SiO$_2$ layers, using a laboratory-built static tester equipped with an objective lens of 0.6 numerical aperture (NA) and a 685 nm laser source for pulsed-heating together with a 633 nm continuous wave (CW) laser source for signal detection.

Figure 4:
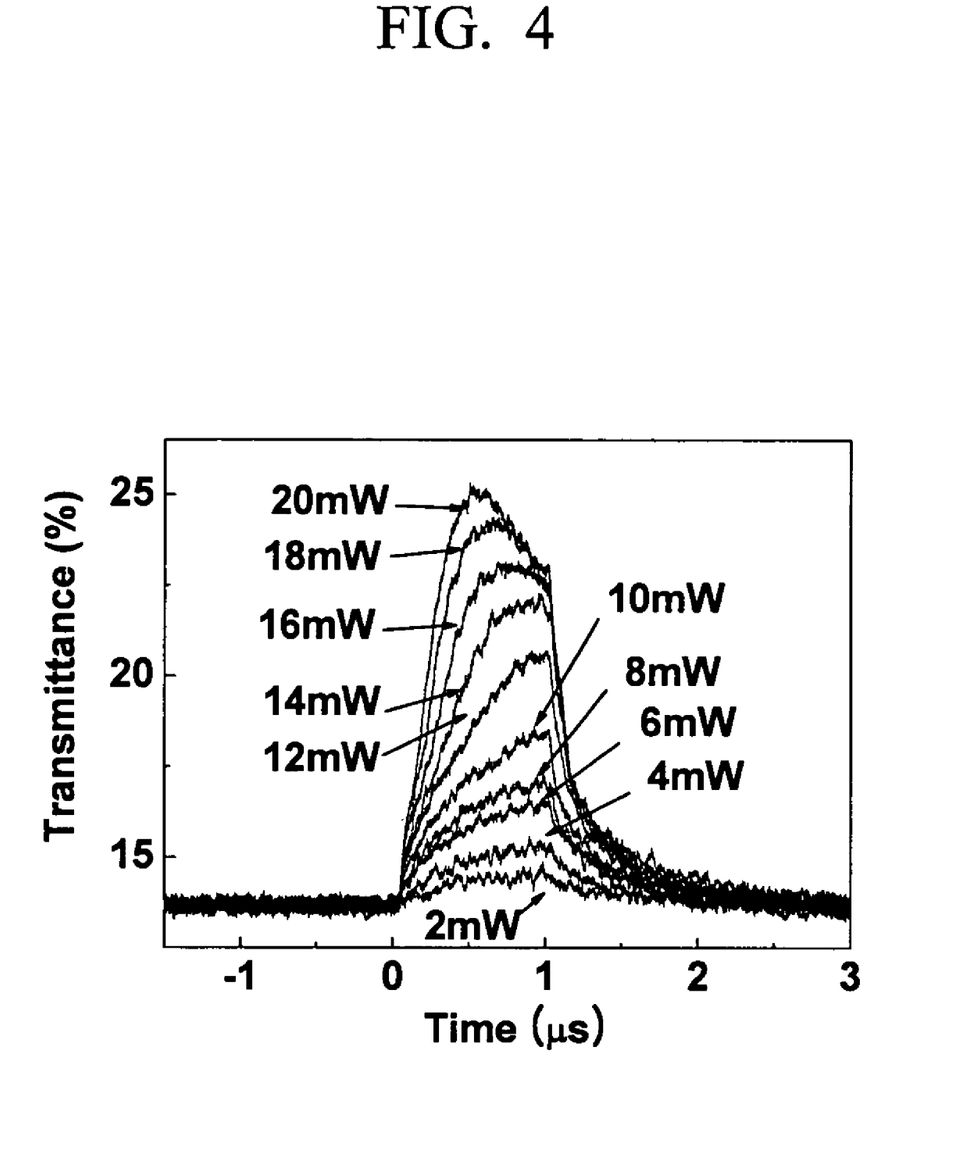
FIG. 4 is a graph representing the static test results; real time transmittance change measured with a CW laser during pulsed heating of the PbTe thin film with a second laser at various powers.
Figure 5:
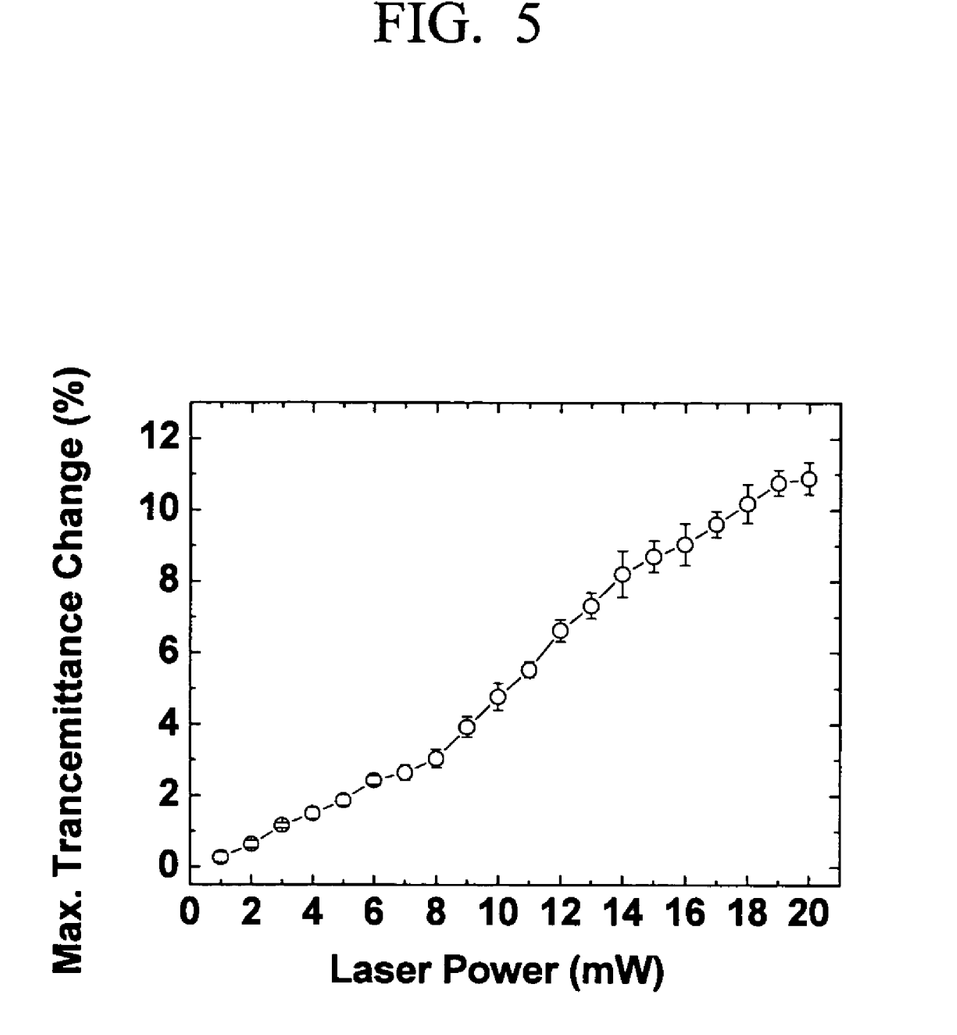
FIG. 5 is a graph displaying the maximum transmittance change with laser power, as determined from FIG. 4.

FIG. 4 depicts the real-time transmittance changes of the CW light with varying power of the pulsed light of 1 μs duration. It should be noted that the transmittance grows upon firing the heating pulse, yet restoring its initial level with ending the pulse regardless of power. Besides, light transmittance increases with power, as shown more clearly by curve in FIG. 5 representing the maximum transmittance change as a function of power. Conceivably, both of these attributes seem to place the present material as a candidate for SR readout and writing as well.

Notice an inflection around 7-8 mW in the curve of FIG. 5. To examine its nature in terms of the possible melting of the PbTe film, static tests were made in conjunction with a TEM study using a sample of the same 3-layer stack. From the test results, it is concluded that the inflection as observed in FIG. 5 is indeed a signature of the onset of laser melting of PbTe and that the growing transmittance with power below the inflection may be accounted for by a solid state thermo-optic effect.

EXAMPLE 3

Figure 6:
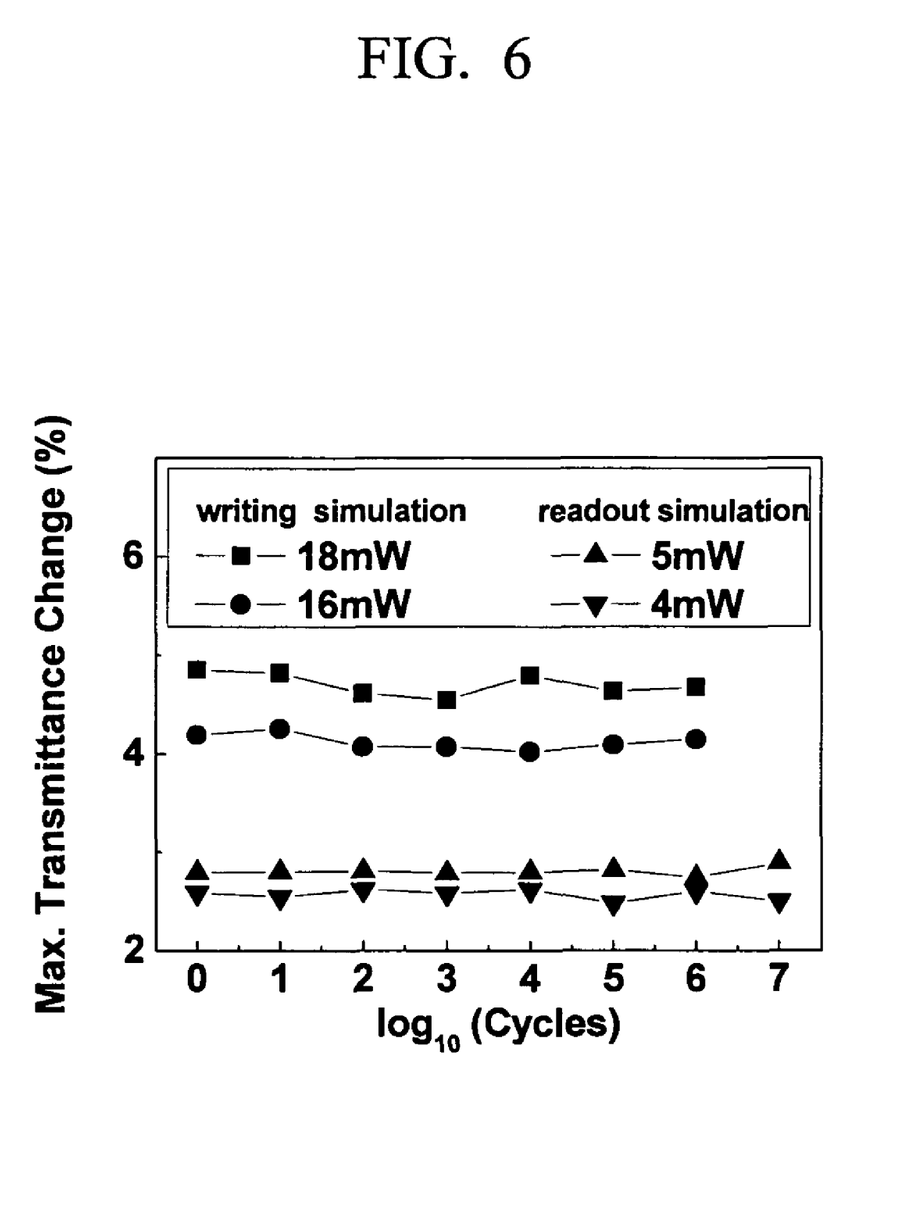
FIG. 6 is a graph showing the results from static tests of the durability of the PbTe thin films against repeated laser heating at the power regimes representing readout and writing respectively, according to FIG. 5.

Static durability tests of the PbTe film were made at two different power regimes of curve in FIG. 5, using trains of single pulses, each consisting of 1 μs pulse duration with a period of 20 μs at a lower power regime, and 100 ns duration with a period of 100 μs at a higher power regime. Notice that the periods are much smaller than the time for one revolution of a disk in service. The results are shown in FIG. 6. Evidently, the material suffers no degradation against repeated laser heating within the numbers of cycles tested. No extended repetition of laser heating was attempted beyond $10^7$ at lower powers and $10^6$ at higher powers, respectively. Considering 10$^6$ repetitions required for readout and $10^3$-$10^5$ repetitions required for writing in general, it is concluded from the result that the PbTe film has excellent durability for SR capability.

EXAMPLE 4

Figure 7A:
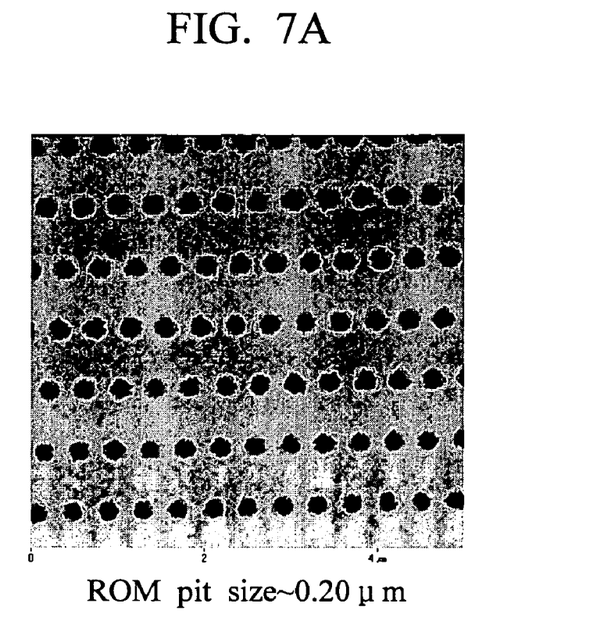
FIGS. 7A and 7B are the atomic force microscope images of the disk substrates having pits of two different sizes less than the resolution limit (0.27 µm) of the 650 nm/0.6NA system, which are utilized to prepare ROM disks with PbTe thin films for super-resolution readout.
Figure 7B:
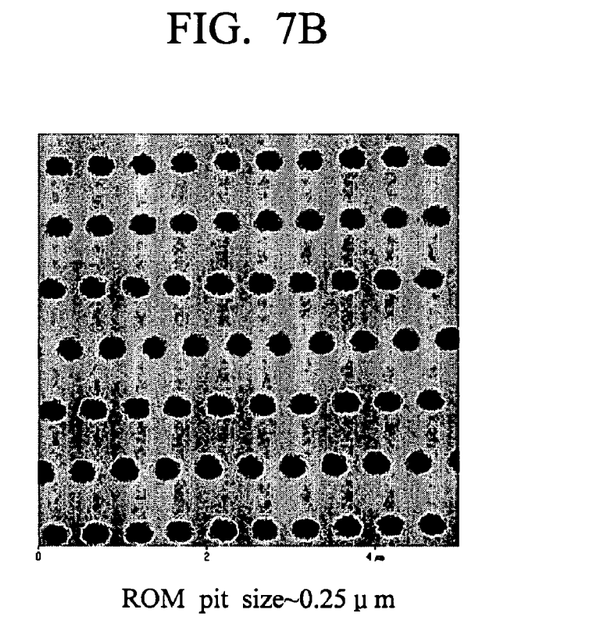

In order to examine the SR readout capability of the PbTe film especially at low laser powers, ROM disk samples of 3-layer stacks were tested using a commercial dynamic tester (ShibaSoku LM330A) equipped with a 650 nm laser source and 0.6NA objective lens. A 0.6 mm thick polycarbonate substrate was used. Two sized ROM pits (0.25 μm and 0.2 μm) smaller than a ROM pit (0.27 μm) in diffraction limit of an optical system used were arranged on the substrate at spatial periods of 0.5 μm and 0.4 μm, respectively. FIGS. 7a and 7b show an AFM (Atomic Force Microscopy) image of a manufactured substrate (ROM pit size: 0.20 μm in FIG. 7a and 0.25 μm in FIG. 7b).

Figure 8:
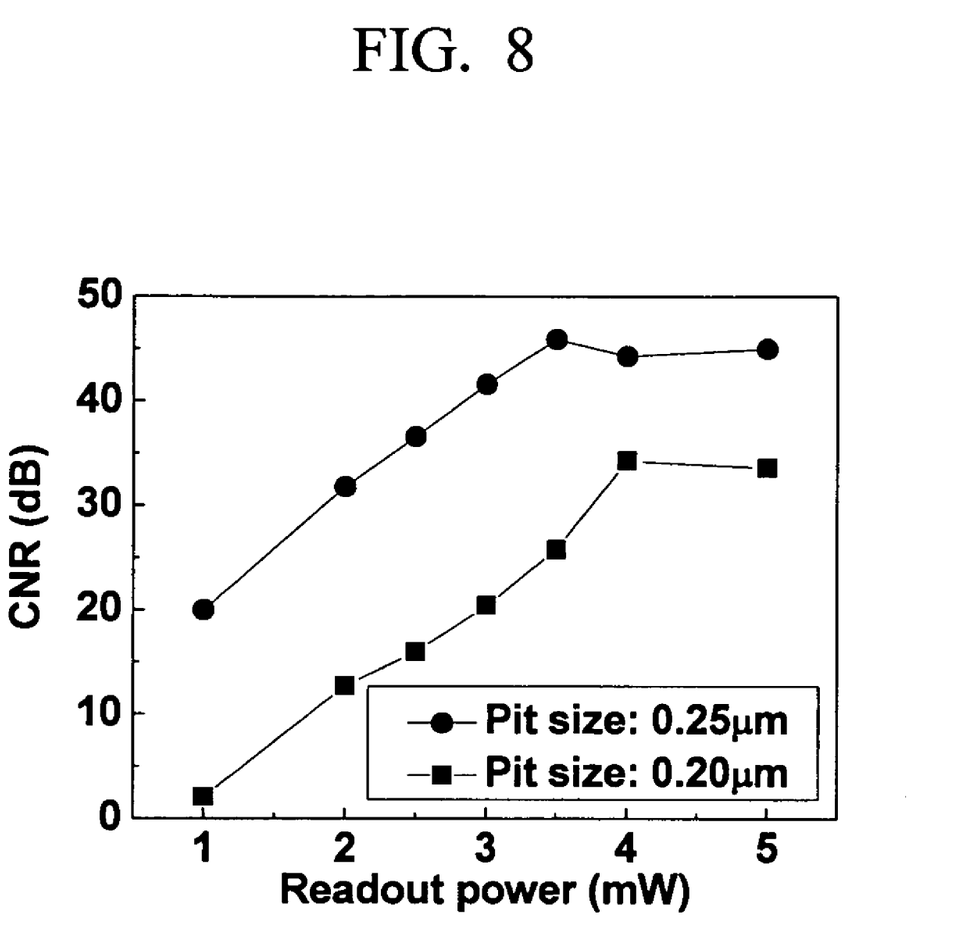
FIG. 8 is a graph showing CNR values with readout laser power, as determined from dynamic readout tests of the aforementioned ROM disks with PbTe super-resolution layers.

Shown in FIG. 8 are the CNR values measured at the linear velocity of 2 m/s under the tracking-off condition and at readout powers ranging from 1 to 5 mW. With essentially the same stack as used in static tests, carrier to noise ratio (CNR) values are found to reach about 42 dB at 3 mW for 0.25 μm pit and close to 35 dB at 4 mW for 0.2 μm pit. The maximum CNR value reads 47 dB at 3.5 mW for 0.25 μm pit.

The super resolution materials in accordance with the present invention offer a high SR readout capability and moreover an excellent durability against repeated laser heating. Thus, the materials can be used as an SR layer of an optical data storage, especially for realizing ultrahigh density of WORM or rewritable disks as well as ROM disks.

What is claimed is:

1. A read-only optical data storage medium on which optical data has been prerecorded, comprising
    a transparent substrate having the optical data recorded on a surface thereof,
    a first protective layer formed on the substrate,
    a super-resolution (SR) layer formed on the first protective layer, and
    a second protective layer formed on the SR layer,
    wherein the SR layer is made of a thermoelectric material having light absorption, transmittance and reflectance at the wavelength of an incident light while maintaining a crystalline single phase without a structural or a chemical change at a temperature ranging from room temperature to the melting temperature of the material;
    wherein the optical data from the medium are read by means of nonlinear changes in optical properties of the SR layer material with laser power, said nonlinear changes in the optical properties being thermoelectrically induced within a local area of the SR layer under laser irradiation while that the SR layer does not undergo a structural or chemical change; and
    wherein the SR layer material is PbTe.

2. The read-only optical data storage medium of claim 1, wherein said SR layer material is stable over a temperature ranging from a room temperature to its melting temperature, with neither phase change nor phase decomposition, and has a thermoelectric coefficient of greater than 100 μV/K.

3. The read-only optical data storage medium of claim 1, wherein the super resolution layer forms a crystalline phase upon deposition.

* * * * *